Sept. 2, 1952     W. O. BAKER ET AL     2,609,256
BALL BEARING
Filed April 28, 1951
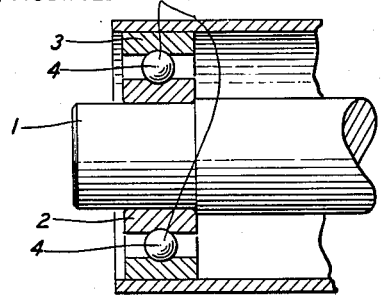
BALLS OF
THERMALLY DEHYDROGENATED
HYDROCARBON POLYMERS
OR MODIFIED HYDROCARBON POLYMERS
INVENTORS W. O. BAKER
F. H. WINSLOW
BY
Edwin B. Cave
ATTORNEY Patented Sept. 2, 1952

2,609,256

UNITED STATES PATENT OFFICE 2,609,256

BALL BEARING

William O. Baker, Morristown, and Field H. Winslow, Springdale, N. J., assignors to Bell Telephone Laboratories, Incorporated, New York, N. Y., a corporation of New York Application April 28, 1951, Serial No. 223,637

7 Claims. (Cl. 308—188)

This invention relates to ball bearings and particularly to bearings of this type which are capable of being constructed in extremely small sizes for use in delicate instruments, such as watches and electrical or physical measuring instruments.

In the construction of delicate instruments having small rotating parts, it is desirable that these moving parts be supported by bearings exerting as little frictional resistance to rotation as possible. Because of their low frictional resistance, ball bearings are desirable for such uses but have not been employed because of the unavailability of balls of sufficiently small size which possessed the requisite sphericity and other necessary physical properties.

The bearings of the present invention employ balls of thermally dehydrogenated hydrocarbon polymers or polymers containing carbon, hydrogen and an additional normally solid element. Most commonly, these thermally dehydrogenated materials consist substantially entirely of carbon (containing less than 1 per cent hydrogen and preferably less than 0.5 per cent hydrogen) and it is in connection with bearings using such carbon balls that the invention will first be described.

The accompanying drawing is a sectional view of one type of ball bearing constructed according to the present invention.

In the bearing shown in the drawing, a horizontal shaft 1 carries an inner race 2 which cooperates with an outer race 3 to provide a raceway in which the balls 4 ride.

When the balls consist essentially of carbon, they are formed by the substantially complete pyrolytic dehydrogenation in situ of spheres of hydrocarbon polymers. When the polymers are of the requisite nature, as will be discussed more fully below, the substantially complete dehydrogenation of the spheres yields solid spheres of lustrous, hard, coherent carbon having a microscopically smooth surface. These carbon spheres may contain up to 50 per cent or more of the carbon originally present in the polymer and have diameters of the order of one-half the diameter of the original polymer spheres.

The original polymer bodies can be formed in perfect spherical shape in sizes as small as are desired for purposes of the present invention by the so-called pearl or bead polymerization of liquid monomers.

In the formation of polymer spheres by this method, the material to be polymerized is agitated, as by rapid stirring, together with a body of a non-solvent suspension liquid, such as water. Under the influence of the continuing agitation, the material to be polymerized breaks up into spherical globules dispersed in the suspension liquid. The entire system is maintained at a polymerizing temperature until rigid, non-tacky polymer spheres are produced. The polymerization in suspension can be continued until the requisite degree of cross-linking, as set forth below, has been achieved or the polymer spheres can be removed from the suspension after they have become rigid and non-tacky and can be subsequently heated to complete their polymerization.

The manner in which a partial yield of polymer spheres of mixed sizes can be produced by this method is known to the art. A procedure by which high yields of spheres falling within a narrow size range can be produced is described and claimed in the copending application of F. H. Winslow, Serial No. 182,309, filed August 30, 1950.

According to this procedure, a liquid mass of material to be polymerized, which contains a polymerization catalyst, is rapidly stirred by a rotary stirrer into suspension in at least five times as much by volume, and preferably ten to fifteen times as much by volume, of water or an aqueous solution of an inorganic salt, the pH of which is maintained at a value between 3 and 7 and which has dissolved in it between 0.25 per cent and 5 per cent, and preferably about 2 per cent, of a suspension stabilizing agent comprising polyvinyl alcohol having a degree of hydrolysis of at least 95 per cent and preferably at least 98 per cent and having an intrinsic viscosity in aqueous solution of between 0.3 and 0.9. The temperature of the system is maintained between about 60° C. and 100° C., and preferably between about 75° C. and 85° C., until the suspended spheres have polymerized to a rigid, non-tacky state.

In this process, an increase in the rate of agitation and an increase in the concentration of the polyvinyl alcohol in the aqueous suspension medium tend to decrease the size of the spherical polymer particles which are produced. Similarly, the use of polyvinyl alcohols of decreasing degrees of hydrolysis or of increasing intrinsic viscosities tends to decrease the size of the spheres. With polyvinyl alcohols having degrees of hydrolysis and intrinsic viscosities falling within the range set forth above, a high yield of unagglomerated spheres, the greater proportion of which have a diameter falling within a narrow range of size distribution, can be obtained with average diameters lying between .05 millimeter and 1.5 millimeters. Larger spheres can be obtained in lower yield by decreased agitation and lower concentrations of polyvinyl alcohol, particularly when the lower viscosity grades of polyvinyl alcohol are used. When it is desired to produce spheres of smaller diameter, down to .005 millimeter for instance, a polyvinyl alcohol of lower degree of hydrolysis, for instance about 77 per cent, and a higher intrinsic viscosity, for instance about 1.0, may be used.

In the procedure described above, any conventional polymerization catalyst can be employed. Benzoyl peroxide, used in amounts of between about 0.5 per cent and 4 per cent, and preferably in an amount of 1 per cent of the weight of the monomer or monomer mixture, is particularly suitable. Other peroxide or hydroperoxide catalysts can be used.

For practical operation, it is ordinarily feasible to produce perfect carbon spheres having diameters between about .01 millimeter and about 1 millimeter by the dehydrogenation of polymer spheres produced in this manner.

Carbon spheres for use in the bearings of the present invention can be successfully produced by the dehydrogenation of any hydrocarbon polymer spheres provided the polymer is sufficiently cross-linked to permit it to be converted in situ to carbon without excessive loss due to decomposition into low molecular weight carbon-containing volatile products. The degree to which a polymer body swells when in equilibrium with a solvent is a measure of its degree of cross-linking. Any polymer which does not swell to more than five times its original volume, and preferably does not swell to more than 1.25 times its original volume, in a thermodynamically inert solvent (having no substantial heat of solution), such as benzene or carbon tetrachloride, is adequately cross-linked to permit successful pyrolytic dehydrogenation provided that, where necessary, it is first subjected to an air baking or equivalent procedure as will be described in more detail below.

Polymers having the requisite degree of cross-linking can be formed by the polymerization of any monomer which possesses a sufficient degree of non-benzenoid carbon-to-carbon unsaturation. The unsaturation in the monomer, which determines the degree of cross-linking which the polymer can achieve, can be expressed in terms of functionality, with each olefinic double bond in the molecule contributing a functionality of 2 and each acetylenic triple bond contributing a functionality of 4.

If the cross-linking in the polymer is sufficiently great, as when polymerizable material of which it is formed contains at least 50 per cent by weight of a monomer having a functionality of at least 6, the polymer spheres can be subjected directly to pyrolytic dehydrogenation by heating in a non-oxidizing atmosphere and will yield solid, coherent spheres which contain from 30 per cent to 50 per cent or more of the carbon originally present in the polymer.

When the polymer is formed of a monomer or monomer mixture of substantially lower average functionality, it will not be sufficiently cross-linked to give such a high yield of carbon upon pyrolysis. When bodies of such a polymer are heated in a non-oxidizing atmosphere, they may leave no carbon residue at all or, at best, they may leave no more than about 10 per cent of the carbon originally present in the polymer. If there is a residue in such a case, the residue will retain the original form of the polymer body but will be a hollow shell.

If the average functionality of the monomer or monomer mixture from which the polymer is formed is at least 2.4, the yield of the carbon residue can be increased substantially by heating the polymer spheres in air or other oxygen-containing atmosphere, prior to pyrolytic dehydrogenation, to temperatures between 200° C. and 300° C. and preferably at 250° C. Although it is possible to obtain a substantial increase in the yield of carbon residue by air baking for as little as two hours, more substantial increases in yield are obtained if the baking is continued for at least four hours. For the greatest increase in yield, the baking is continued for longer periods of, for instance, twenty-four hours or one week or even two weeks. The average functionality of a monomer mixture is computed by multiplying the mol fraction of each monomer in the mixture by the functionality of that monomer and adding the products thus obtained.

By this air baking procedure, solid carbon spheres containing 50 per cent or more of the carbon originally contained in the polymer can be produced by the pyroltic dehydrogenation of polymers which, in the absence of preliminary air baking, would give carbon yields of less than 10 per cent. The preliminary air baking can also be used to increase the yield of carbon from the highly cross-linked polymers formed from monomers or monomer mixtures having an average functionality of at least 6. However, the proportional increase in carbon yield due to preliminary air baking decreases as the initial cross-linking of the polymer increases and is not great for the very highly cross-linked polymers. A similar increase in the carbon yield can also be obtained by a preliminary baking, under the same conditions as set forth above, in certain atmospheres other than air, such as ammonia, nitric oxide, hydrogen sulfide, sulfur dioxide or methyl amine.

Of the various available hydrocarbon monomers from which the polymer spheres referred to above can be produced, particularly desirable results are obtained where the polymer is formed entirely of vinyl aromatic hydrocarbon monomers, particularly vinyl benzenes. Such polymers may be formed, for instance, of divinyl benzene or trivinyl benzene alone or in mixture with each other or with a monovinyl benzene such as styrene, methyl styrene, ethyl styrene or some other vinyl benzene having, on the benzene ring, one or more alkyl substituents, particularly those containing up to six carbon atoms. A commercially available technical form of divinyl benzene, containing about 50 per cent divinyl benzene isomers, about 40 per cent ethyl vinyl benzene and the remainder inert diethyl benzene was found well suited for the production of the carbon spheres for use in the devices of the present invention.

The formation of highly cross-linked hydrocarbon polymer spheres has been described above as accomplished by the polymerization of hydrocarbon monomers of sufficient functionality. The hydrocarbon polymers can also be formed from linear or network polymers which contain only carbon atoms in the linear chains or networks but which also contain substitutent atoms or radicals containing elements other than carbon and hydrogen, such as oxygen, nitrogen, sulfur or halogens, and which upon heating are converted to cross-linked hydrocarbon polymers. Thus, polyvinyl alcohol, which is an essentially linear polymer, evolves its oxygen in the form of water when heated to a temperature of 250° C. in a non-oxidizing atmosphere. The unsaturation introduced by the splitting off of the substituents results in extensive cross-linking so that, by the time substantially all of the oxygen has been driven off, as for instance, after about fifteen hours at 250° C., a hydrocarbon polymer possessing adequate cross-linking for use in the process of the present invention has been produced.

Similarly, polyvinylidene chloride and polyvinyl chloride, both essentially linear polymers, evolve HCl when heated in inert or non-oxidizing atmospheres or in the presence of dehalogenating agents and yield cross-linked hydrocarbon polymers suitable for the purposes of the present invention.

Examples of other cross-linked polymers which contain elements other than carbon and hydrogen and which are converted to cross-linked hydrocarbon polymers upon heating in a non-oxidizing atmosphere are the polymers of vinyl acrylic acid, chlorovinyl acrylic acid, propenyl ethinyl carbinol, propenyl ethinyl ketone, vinyl ethinyl ketone, hex-3en-5yn-2ol and hex-3en-5yn-2one.

These compounds containing elements other than carbon and hydrogen can be polymerized in the form of spheres by the technique described above. Upon being heated to 250° C., these spheres will be converted to hydrocarbon polymer spheres which are in turn converted to carbon spheres upon dehydrogenation.

The pyrolysis of the hydrocarbon polymer spheres, with or without preliminary air baking, is carried out in a non-oxidizing atmosphere to prevent loss of carbon by oxidation. The most suitable atmosphere for this purpose is nitrogen at atmospheric pressure, although superatmospheric or subatmospheric pressures may be used if desired. Other atmospheres which are non-oxidizing, such as helium, hydrogen or a sufficiently high vacuum, may be used if desired.

The hydrocarbon bodies are brought gradually to the maximum temperature of pyrolysis so as to allow the gradual release of the gases which are developed and thus prevent destruction of the bodies. It has been found that a temperature rise of about 200° C. per hour between about 300° C. and the maximum temperature yields desirable results. Obviously, the bodies may be heated more slowly if desired, as for instance at an average rate of about 5 degrees per hour. A more rapid rate of heating, up to about 500° C. per hour, may also be used. It is apparent that, although the temperature increase can be made continuous, it is more readily brought about by stepwise increases, for instance, of the order of 25° C. to 100° C. apart.

The residual amount of hydrogen remaining in the final carbon product is dependent upon the maximum temperature to which the bodies are brought during pyrolysis for a substantial period of time. A product consisting of at least 99 per cent carbon can be produced by carrying the pyrolytic temperature to 850° C. and maintaining the material at this temperature for one-half hour or more.

In a typical product subjected to pyrolysis at a temperature increasing at the rate of 200° C. per hour until a temperature of 900° C. was reached and maintained at that temperature for one-half hour, the hydrogen content was found to be 0.64 per cent by weight. After being maintained at 1000° C. for one hour, the hydrogen content was reduced to 0.36 per cent. The hydrogen content was reduced further to 0.23 per cent by heating one hour at 1100° C., to 0.12 per cent by heating one hour at 1200° C. and to between 0.02 per cent and 0.01 per cent by heating one to three hours at 1300° C. These values represent a hydrogen content of one hydrogen atom per twenty-three carbon atoms in the product heated to 1000° C. and one hydrogen atom per four hundred to eight hundred carbon atoms in the product heated to 1300° C.

As indicated above, the electrical resistivity of the product at 25° C. varies between about $10^5$ ohm-centimeters for a hydrogen content of about 1 per cent and $10^{-2}$ ohm-centimeters (about three hundred times the resistance of graphite) for a hydrogen content not exceeding about .02 per cent. The hardness of the product is higher than that of any carbon yet recorded, other than diamond.

The carbon spheres which are produced possess a hardness greater than that of any form of carbon hitherto reported, other than diamond. The surfaces of the spheres are extremely smooth. Electron micrographs of surface replicas at magnifications up to 14,000 show an essentially smooth surface with occasional small craters but with substantially no outward projections. These characteristics insure a minimum of friction in bearings in which they are used.

X-ray diffraction patterns and other observations indicate that the carbon of which these spheres are formed is less graphitic and more diamond-like in its atomic arrangement than any other form of carbon hitherto reported. This atomic arrangement possesses extraordinary stability in that, unlike other forms of pyrolytic carbon, it is not converted to graphite by heating for several hours at 2400° C.

It is possible to provide a permanent lubrication for the carbon spheres described above by providing them with a surface coating of graphitic carbon. Such a surface coating can be applied to the carbon spheres by first depositing a layer of pyrolytic carbon from a hydrocarbon gas or vapor by the procedures well known in the art. Thus, such a layer of pyrolytic carbon can be deposited by rotating a mass of the spheres in a rotary furnace at 24 revolutions per minute at a temperature of 1150° C. for two hours while passing hydrogen or nitrogen containing 30 per cent methane through the furnace. The coatings can then be completely graphitized by heating the spheres to a temperature of 2400° C. in a non-oxidizing atmosphere. The inherent lubricating properties of the graphite will serve to lubricate the spheres in the bearings.

The description above has pertained primarily to the production of carbon spheres having a hydrogen content of less than 1 per cent. Spheres suitable for use in the bearings of the present invention can be produced with a lesser degree of dehydrogenation of the polymer spheres which leaves a hydrogen content of up to 5 per cent. These spheres of higher hydrogen content will resemble the essentially carbon spheres except that the hardness decreases as the hydrogen content increases. The hardness will nevertheless be adequate for the purposes of the present invention.

These dehydrogenated spheres containing up to 5 per cent hydrogen are prepared by the same techniques as described above except that the final pyrolysis is carried out at a lower ultimate temperature. These temperatures will vary between 400° C. and 850° C. depending upon the degree of dehydrogenation desired and upon the nature of the original hydrocarbon polymer.

As indicated above, the spheres used in the bearings of the present invention may, regardless of whether they have a high or a low hydrogen content within the ranges set forth above, contain an additional normally solid element other than carbon. This additional element may be present in amounts up to 20 per cent of the product and has no substantial effect upon the properties of the spheres in so far as their use in the bearings of the present invention is concerned.

As examples of such additional elements may be mentioned silicon, boron, phosphorus, silver, titanium, aluminum, germanium, bismuth, tin and other metals and metalloids. Such elements are introduced into the product when they are contained, in addition to carbon and hydrogen, in the monomers of which the polymer spheres are formed.

For instance, silicon can be introduced into the carbon spheres by forming them from polymer spheres formed from a monomer or monomer mixture containing silicon. Examples of such silicon-containing monomers are the polyallyl silanes, such as tetraallyl silane, methyl triallyl silane or dimethyl diallyl silane which may be polymerized alone or in mixture with one another or with a polymerizable hydrocarbon monomer such as divinyl benzene or trivinyl benzene. Other such monomers are the silyl styrenes, such as trimethyl silyl styrene, triethyl silyl styrene or other trialkyl silyl styrenes, which should be copolymerized with another monomer of higher functionality, such as divinyl benzene, trivinyl benzene, tetraallyl silane, methyl triallyl silane or dimethyl diallyl silane.

The formation of the dehydrogenated spheres from such polymers is carried out by the same procedure as described above for the treatment of spheres formed of hydrocarbon polymers.

The invention has been described in terms of its specific embodiments and, since certain modifications and equivalents may be apparent to those skilled in the art, this description is intended to be illustrative of but not necessarily to constitute a limitation upon the scope of the invention.

What is claimed is:

1. A ball bearing comprising a pair of bearing surfaces spaced by at least one sphere formed of a hard, lustrous, coherent carbon and having a diameter less than 1 millimeter.

2. A ball bearing comprising a pair of bearing surfaces spaced by at least one sphere formed of a hard, lustrous, coherent carbon coated on its surface with a continuous layer of graphitic carbon.

3. A ball bearing comprising a pair of bearing surfaces spaced by at least one sphere of a hard, lustrous, homogeneous continuous material consisting of at least 80 per cent carbon and less than 5 per cent hydrogen based on the weight of the carbon, any remainder being another normally solid element.

4. A ball bearing comprising a pair of bearing surfaces spaced by at least one sphere of a hard, lustrous hydrocarbon dehydrogenated in situ to a hydrogen content not greater than 5 per cent.

5. A ball bearing comprising a pair of bearing surfaces spaced by at least one sphere of a hard, lustrous hydrocarbon dehydrogenated in situ to a hydrogen content not greater than 1 per cent.

6. A ball bearing comprising a pair of bearing surfaces spaced by at least one sphere, having a diameter not greater than 1 millimeter, formed by polymerizing polymerizable hydrocarbon liquid in aqueous suspension to form a hydrocarbon polymer sphere and thermally dehydrogenating said sphere by heating it in a non-oxidizing atmosphere.

7. A ball having an inherently lubricated bearing surface, said ball comprising a sphere formed of a hard, lustrous, coherent carbon resulting from the thermal dehydrogenation in situ of a hydrocarbon polymer sphere, said sphere being coated on its surface with an integral continuous adherent layer of graphitic carbon.

WILLIAM O. BAKER.
FIELD H. WINSLOW.

REFERENCES CITED

The following references are of record in the file of this patent:

UNITED STATES PATENTS

| Number | Name | Date |
|---|---|---|
| 1,631,763 | Rouanet | June 7, 1927 |
| 2,158,156 | Schroder | May 16, 1939 |
| 2,534,929 | Schultz et al. | Dec. 19, 1950 |